United States Patent
Dimitrov et al.

(10) Patent No.: US 11,178,141 B2
(45) Date of Patent: Nov. 16, 2021

(54) PERSISTABLE IDENTITY TOKENS

(71) Applicant: VMware, Inc., Palo Alto, CA (US)

(72) Inventors: Georgi L Lyubomirov Dimitrov, Plovdiv (BG); Muhammad Akbar, Santa Clara, CA (US); John Brezak, Camano Island, WA (US); Andrew Gormley, Bothell, WA (US); Barry Gerhardt, Snohomish, WA (US)

(73) Assignee: VMware, Inc., Palo Alto, CA (US)

( * ) Notice: Subject to any disclaimer, the term of this patent is extended or adjusted under 35 U.S.C. 154(b) by 210 days.

(21) Appl. No.: 16/709,913

(22) Filed: Dec. 10, 2019

(65) Prior Publication Data

US 2021/0176236 A1   Jun. 10, 2021

(51) Int. Cl.
*H04L 29/06* (2006.01)
*G06N 20/00* (2019.01)
*G06F 9/48* (2006.01)

(52) U.S. Cl.
CPC ........ *H04L 63/0853* (2013.01); *G06F 9/4881* (2013.01); *G06N 20/00* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 10,666,657 B1 * | 5/2020 | Threkeld | H04L 63/20 |
| 10,715,514 B1 * | 7/2020 | Threkeld | H04L 63/20 |
| 2007/0043954 A1 * | 2/2007 | Fox | H04L 9/3271 |
| | | | 713/185 |
| 2012/0304245 A1 * | 11/2012 | Lawson | H04L 63/08 |
| | | | 726/1 |
| 2014/0282993 A1 * | 9/2014 | Van Till | G07C 9/27 |
| | | | 726/9 |

* cited by examiner

*Primary Examiner* — Cai Y Chen

(57) ABSTRACT

The disclosure provides for authentication and/or authorization via persistable identity tokens, so an original identity provider (e.g., a user) does not need to be present upon initiating execution of a task. Examples include requesting a persistable token in exchange for a first live token. Based at least on the request for the persistable token complying with a first set of policies, receiving the persistable token. Based at least on a trigger event, requesting a second live token in exchange for the persistable token. Based at least on the request for the persistable token complying with a second set of policies, receiving the second live token. Based at least on receiving the second live token, initiating execution of a task using the second live token for authentication or authorization, wherein the execution of the task is contingent upon the authentication or authorization.

20 Claims, 7 Drawing Sheets

PERSISTABLE IDENTITY TOKENS

BACKGROUND

When a user schedules an offline task to occur at a future time, either as a single occurrence or as a series, and execution of the task is contingent upon authentication and/or authorization with a token, the required permission may fail when the user is absent, preventing the task from executing. This occurs when the authentication token used for creation of the scheduled task is not valid at the time the task is to be executed. Common scenarios are that a live token is required but has expired, and two-factor authentication is required but the user is not present.

Prior attempts to permit delayed scheduling of tasks include continuously refreshing the token until execution and using refresh tokens. Unfortunately, continuously refreshing tokens introduces security risks when authentication secrets are stored. Additionally, continuously refreshing tokens may be unreliable when the time delay is long (e.g., due to a restart or outage lasting longer than the token's lifespan). Using refresh tokens may also require contacting the user who provided the identity for authentication or authorization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for authentication and/or authorization via persistable identity tokens, so an original identity provider (e.g., a user) does not need to be present upon initiating execution of a task. An exemplary solution for permission via persistable identity tokens comprises: requesting, by a task scheduler, a persistable token in exchange for a first live token; based at least on the request for the persistable token complying with a first set of policies, receiving, by the task scheduler, the persistable token; based at least on a trigger event, requesting, by the task scheduler, a second live token in exchange for the persistable token; based at least on the request for the persistable token complying with a second set of policies, receiving, by the task scheduler, the second live token; based at least on receiving the second live token, initiating execution of a task using the second live token for authentication or authorization, wherein the execution of the task is contingent upon the authentication or authorization.

BRIEF DESCRIPTION OF THE DRAWINGS

The present description will be better understood from the following detailed description read in the light of the accompanying drawings, wherein.

DETAILED DESCRIPTION

Figure 1:
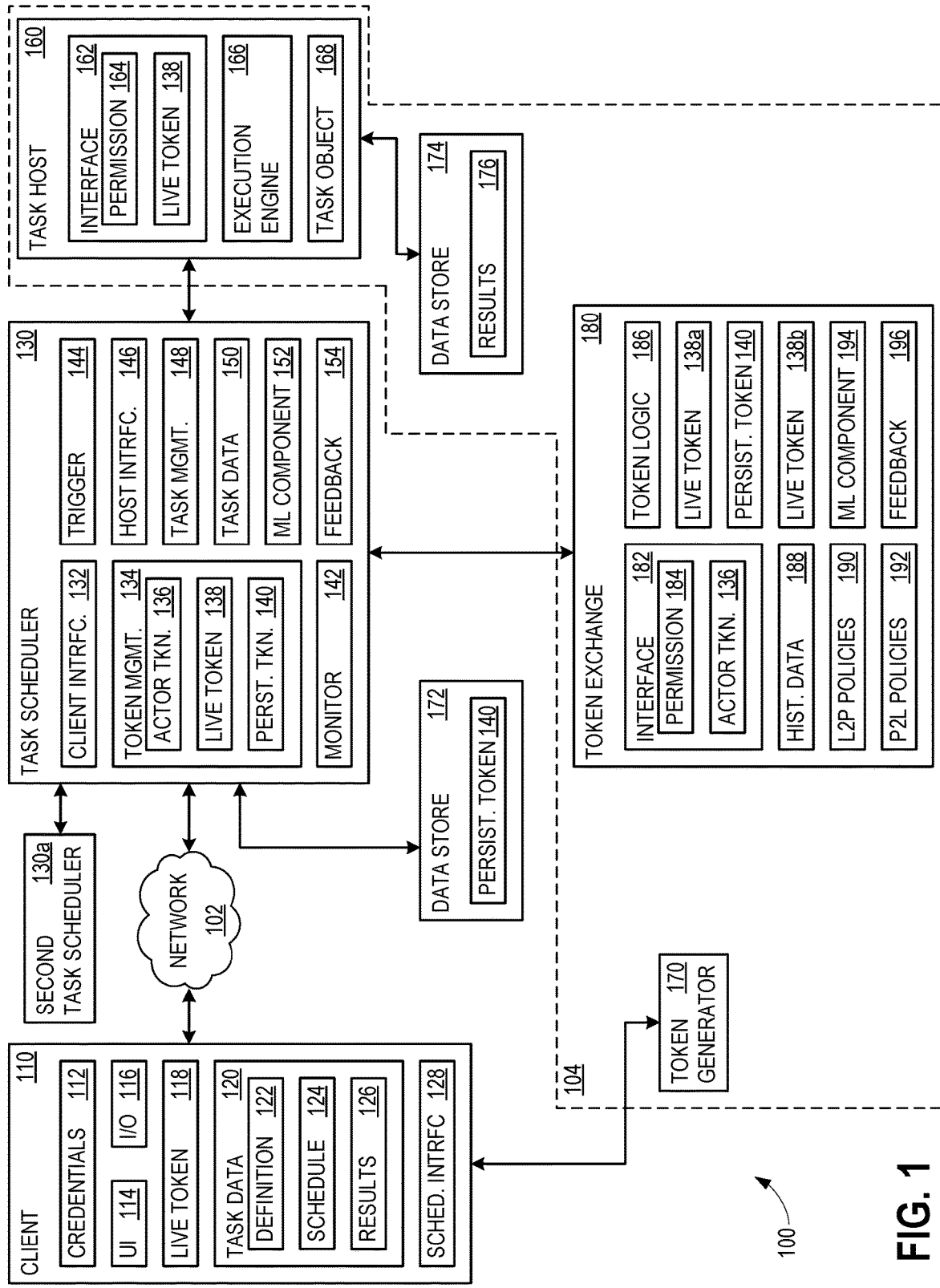
FIG. 1 illustrates a block diagram of an example architecture that can advantageously employ persistable identity tokens.

Various aspects of the systems and methods described herein provide at least a solution for authentication and/or authorization via persistable identity tokens, so that an original identity provider (e.g., an administrator or other user) does not need to be present upon initiating execution of a task. This additional functionality enables significant flexibility for scheduling tasks at distant times (e.g., after a live token will have expired) and disaster recovery, including recovery without network access. Persistable may also be referred to herein as persistent.

Examples include a task scheduler requesting a persistable token in exchange for a first live token. Based at least on the request for the persistable token complying with a first set of policies, the task scheduler receives the persistable token and then, based at least on a trigger event, requests a second live token in exchange for the persistable token. Based at least on the request for the persistable token complying with a second set of policies, the task scheduler receives the second live token. Based at least on receiving the second live token, task execution is initiated using the second live token for authentication or authorization and contingent upon the authentication or authorization.

Aspects of the disclosure operate in an unconventional manner by using persistable identity tokens, which can be safely stored offline for an extended period of time, and later exchanged for live tokens, when needed for task execution, without needing to contact a user to re-enter credentials to run against the original identity provider. A persistable token is a token that preserves the identity of the client, but is not useable for accessing a resource the way that a live token may be used. In some examples, authorization required to access a resource, whether groups or privileges, is derived from the persistent token when exchanged for a live token, to avoid the need to newly query an identity server (which may change over time). This permits safe storage. In general, live tokens used for access are short lived, and require use of a secret. Storing the secret in order to create an access token when the user is not available (thereby mimicking the user) is typically a poor security practice. In some examples, exchanges between persistable tokens and live tokens (in either direction) may require that the acting node, such as a task scheduler, furnish its own token (e.g., an actor token) to a token exchange that supplies the persistable tokens and the live tokens that are exchanged for persistable tokens.

Aspects of the disclosure advantageously permit execution of a task using a live token for authentication and/or authorization, in which the live token had earlier been received in exchange for a persistable token. In some examples, if the user's permissions change over time, such as new permissions are granted, newly-expanded permission may be used. In some examples, if the user's permissions change over time, such as prior permissions are curtailed (e.g., when an employee departs), the newly-restricted permissions may be used. Additionally, in some examples, resource usage efficiency is further improved by permitting the alteration of policies governing the exchange of a persistable token for a live token, after the persistable token has already been received. These late-binding policy changes that were not in force upon issuance of the persistable token can nevertheless govern the exchange for a live token and/or provide new (e.g., expanded or curtailed) permissions for the new live token, different from the permissions that were in place upon the user scheduling the task. Such an advantageous capability permits implementation of the least privilege principle, when actual use of live tokens does not utilize all permissions (e.g., unused permissions can be curtailed to leave only the minimum that is required), as well as permits access to new capabilities that had been introduced by an intervening upgrade (e.g., an upgrade occurring after a task was scheduled, but prior to its anticipated execution).

Aspects of the disclosure enhance security of computing operations by exchanging a first live token for a persistable token not useable for accessing a resource, and then based at least on a trigger event, exchanging the persistable token for a second live token useable for initiating execution of a task. Aspects of the disclosure further enhance security of computing operations by identifying the requestor of the persistable token and the second live token using an actor token. Aspects of the disclosure even further enhance security of computing operations by curtailing privileges when needed, even after receiving the persistable token. Additionally, aspects of the disclosure improve computing operation efficiency, such as by using fewer computing resources including processor, storage, and network usage. This is done by altering policies to extend token lifetime and/or add privileges, when needed, under identified conditions. Aspects of the disclosure even further improve computing operation efficiency by delegating tokens, when needed, under identified conditions. In this manner, the operations described herein improve the allocation of computing resources.

FIG. 1 illustrates a block diagram of an example architecture 100 that can advantageously employ persistable identity tokens. Architecture 100 is illustrated as having multiple nodes, including a client 110, a task scheduler 130, a task host 160, a token exchange 180, a token generator 170, and data stores 172 and 174. These nodes may be implemented with one or more computing devices 700, which is described in relation to FIG. 7. In some examples, one or more of these nodes may be implemented as services and/or on cloud-based resources. Client 110 may be a web application, an application programming interface (API) call, a live person, or any entity that can provide valid credentials for executing a task for which execution (e.g., access to resources) is contingent upon authentication or authorization. Client 110 has credentials 112, entered by a user via a user interface (UI) 114 and input/output (I/O) component 116. In some examples, UI includes a graphical user interface (GUI), and in some examples, I/O component 116 includes a computer video monitor, a keyboard, a touchscreen, and/or a biometric sensor. Credentials 112 are used to obtain a first live token 118 from token generator 170. In some examples, token generator 170 has a hardware component for added security. If two-factor authentication is required, it is implemented at this stage, by client 110, to obtain first live token 118.

The user generates at least a portion of task data 120, which includes a task definition 122 and a schedule 124. Task definition 122 may include an identification of a resource to use (e.g., an execution engine 166) and a task object 168 upon which to operate, such as a document to access or alter. Schedule 124 specifies a trigger for when a task is to begin, or resume executing, such as on a timer event (e.g., a calendar event) or some conditions being met (e.g., a software update, a resource crash, or a data storage reaching a certain threshold of use). Results 126 will be populated with interim and/or completed results from executing the task, such as task output and/or status. Client 110 uses task scheduler interface 128 to send data to, and receive data from, task scheduler 130.

As illustrated, client 110 communicates with task scheduler 130 over a network 102, which may be any network suitable for digital communication, including one or more of the internet, a private network, a wide area network (WAN), a local area network (LAN), a wireless network, and a wired network. It should be understood that communication among task scheduler 130, task host 160, token exchange 180, token generator 170, and data stores 172 and 174, may be over network 102 or another suitable network.

Task scheduler 130 has a client interface 132 for communicating with client 110, and a token management component 134 for managing the exchange of live and persistable tokens. For example, token management component 134 has an actor token 136, which token management component 134 uses to identify itself to token exchange 180, when requesting a persistable token in exchange for a live token and/or requesting a second live token in exchange for the persistable token. That is, actor token 136 authenticates the exchange requestor identity by identifying task scheduler 130 as the requestor. Token management component 134 handles the communication with token exchange 180, acting as an interface. In operation, live token 118 is received by task scheduler 130 from client 110 as the first version of live token 138. Task scheduler 130 then exchanges this first version of live token 138 for a persistable token 140 through token exchange 180. Later, task scheduler 130 persistable token 140 for a second version of live token 138, which is used to initiate execution of the task initially defined in task data 120, and stored within task data 150 in task scheduler 130. In some examples, task scheduler 130 stores persistable token 140 in data store 172, as a long term storage location and/or for backup.

In some examples, task scheduler 130 delegates persistable token 140 to a second task scheduler 130a, which may be an equivalent of task scheduler 130, and second task scheduler 130a exchanges persistable token 140 for a second version of live token 138 and initiates execution of the task. In some examples, second task scheduler 130a delegates persistable token 140 to task scheduler 130, so that task scheduler 130 exchanges persistable token 140 for the second version of live token 138 and initiates execution of the task. In examples that permit delegation of persistable token 140, the currently-delegated holder of persistable token 140 is tracked, for example by token exchange 180.

In some examples, in addition to providing information about the authorization level of client 110, persistable token 140 is also used for auditing activity by the user who corresponds to credentials 112. For example, persistable token 140 may be used to track which users access which resources. Persistable token 140 is an identity token that may be stored offline for an extended period of time, and is a delegated identifier (ID) token that is obtained from a service operating as token exchange 180. Persistable token 140 has no validity for access (e.g., zero validity), but is delegated to the actor (e.g., task scheduler 130) that needs to store a token. In some examples, persistable token 140 has its audience set as token exchange 180, rather than as task host 160. For auditing, in some examples, a live token that is exchanged for persistable token 140 will have a specific claim indicating that the live token was obtained from persistable token 140. That is, some examples generate an audit trail based at least on persistable token 140.

A monitoring component 142 monitors for a trigger event defined by trigger 144, such as a timer event or a specified condition or other event. Based at least on detecting the trigger event, task scheduler 130 requests, from token exchange, the second version of live token 138 in exchange for persistable token 140. Based at least on receiving the second version of live token 138, task scheduler 130 initiates execution of the task using live token 138 for authentication or authorization or both. In some examples, task scheduler 130 uses a task host interface 146, under control of a task management component 148 to communicate with task host 160 to initiate execution (e.g., start or resume execution) of a task on task host 160. Task data 150 is initially populated with at least a portion of task data 120 from client 110, but then receives results 176 from task host 160, for forwarding to client 110 to be stored as results 126.

Task host 160 has an interface 162 that communicates with task scheduler 130 to receive a copy of live token 138 from task scheduler 130. Task host 160 grants permission, via a permissioning function 164, to execute the task contingent upon authentication or authorization with live token 138. In some examples, task host 160 has an execution engine 166, such as an application or other resource that performs the task. In some examples, execution engine 166 operates on task object 168, such as a document or file. In some examples, task host 160 stores results 176, from performing the task, in data store 174. In some examples, task host 160 stores results 176 locally. Task host 160 sends results 176 to task scheduler 130 for forwarding to client 110, or in some examples, to client 110 directly. In some examples, only final results are sent as results 176, whereas in some examples, interim results are also sent. In some examples, there may be no results to report to client 110.

Token exchange 180 is within a zone of trust 104, along with task host 160, data store 174, and token generator. That is, task host 160 trusts live tokens produced by token generator, and received from client 110 directly, or from task scheduler 130 via token exchange 180. Token exchange 180 is able to generate live tokens. In some examples, task scheduler 130 is co-located on the same computing node as token exchange 180, but just running as different processes. In some examples, the operations described for token exchange 180 and task scheduler 130 are performed by single component.

Token exchange 180 has an interface 182 that communicates with task scheduler 130 to receive a copy of actor token 136 from task scheduler 130. Token exchange 180 grants permission, via a permissioning function 184, to exchange live and persistable tokens contingent upon authentication with actor token 136. A token logic component 186 receives an incoming live token 138 from task scheduler 130 and stores it as a first live token 138*a*. The incoming live token 138 is accompanied by actor token 136 and a request by task scheduler 130 to exchange incoming live token 138 (now first live token 138*a*) for a persistable token. Token exchange 180 determines whether the request for a persistable token complies with a first set of policies 190. Based at least on the request for a persistable token complying with first set of policies 190, token exchange 180 generates persistable token 140 and sends persistable token 140 to task scheduler 130.

At a later time, based at least on a trigger event, as determined by monitoring component 142 and trigger 144, task scheduler 130 requests a second live token in exchange for persistable token 140. Along with this request, task scheduler 130 sends actor token 136 and live persistable token 140. Token exchange 180 grants permission, via a permissioning function 184, contingent upon authentication with actor token 136. Token exchange 180 determines whether the request for a second live token complies with a second set of policies 192. Based at least on the request for a second live token complying with second set of policies 192, token exchange 180 generates a second live token 138*b*. Token exchange 180 sends second live token 138*b* to task scheduler, which stores it as the second version of live token 138, and which is used to initiate execution of a task.

First set of policies 190 may include restrictions on which actors may obtain a persistable token (e.g., based on an exchange requestor identity), which users may be the subject of a persistable token, and the contents of the persistable token. First set of policies 190 may also include the lifetime of a persistable token, and the maximum count of outstanding persistable tokens that client 110 or a user (identified by credentials 112) may accrue. Data collected from the request to exchange incoming live token 138 for persistable token 140 is stored in historical data 188 for use in determining compliance with second set of policies 192. For example, for a client 110 and or user (identified by credentials 112), a count of requests for a persistable token, a count of previously granted persistable tokens, and a count of outstanding persistable tokens may be stored in historical data 188. As live tokens are exchanged for persistable tokens the outstanding count increments, and as persistable tokens are exchanged for live tokens (or are otherwise invalidated, the outstanding count decrements.

Second set of policies 192 may similarly include restrictions on which actors may obtain a live token (e.g., based on an exchange requestor identity), which users or clients may be the subject of a live token, and the contents of the live token. Second set of policies 192 may also include the lifetime of a live token, and the maximum count of live tokens that client 110 or a user (identified by credentials 112) may accrue. Data stored in historical data 188 may be used for determining compliance with second set of policies 192, such as a count of tokens and/or requests. In some examples, the delegated holder of the persistable token is tracked and stored in historical data 188. In some examples, second set of policies 192 can be altered after task scheduler 130 receives persistable token 140 and prior to task scheduler 130 requesting second live token 138*b*. Such altered policies are late-binding policies, because they bind persistable token 140 with restrictions that were not in place when persistable token 140 was received by task scheduler 130.

In some examples the alteration to second set of policies 192 is selected from the list consisting of: extending a live token lifetime, extending a persistable token lifetime; adding privileges available with a live token, and curtailing privileges available with a live token. Examples are that a live token lifetime is extended from 20 minutes to 2 hours, or shortened. In some examples, persistable tokens do not expire. In some examples, persistable tokens have a lifetime specified within the persistable tokens. In some examples, persistable token lifetimes are specified by an external policy. New permissions can be added, such as if execution engine 166 is updated with new capabilities. Permissions can be curtailed, in response to lack of use, or an intervening security incident. In some examples, altering second set of policies 192 comprises curtailing privileges available with a live token based at least on actual token usage. In some examples, an alteration of second set of policies 192 is selected from the list consisting of: extending a live token lifetime, extending a persistable token lifetime, adding privileges available with a live token, and curtailing privileges available with a live token. In some examples, first set of policies 190 and second set of policies 192 overlap and are stored together. In some examples, at least one of first set of policies 190 and second set of policies 192 includes at least one restriction selected from the list consisting of: an exchange requestor identity, a live token subject, and token content.

A machine learning (ML) component 194 includes ML and/or artificial intelligence (AI) capability to improve the performance of token exchange 180, such as token logic component 186. For example, feedback 196 may include information from historical data 188. Another ML component 152, in task scheduler 130 also includes ML and/or AI capability to improve the performance of task scheduler 130, for example token management component 134 and/or task management component 148. Feedback 154 may include actual historical data regarding which resources were accessed by prior tasks with tokens similar to live token 138. This information may be shared with token exchange 180 and become part of feedback 196. In this manner, ML component 152 or 194 is able to can learn privilege levels and access histories of clients (e.g., client 110) and users. Feedback 154 or 196 may then be used to enable ML component 152 or 194 to determine which resources are actually being used. Discovering the bounds of actual token usage, and then restricting future tokens in accordance with actual usage, with late-binding policies, is consistent with the security principle of least privilege.

Figure 2:
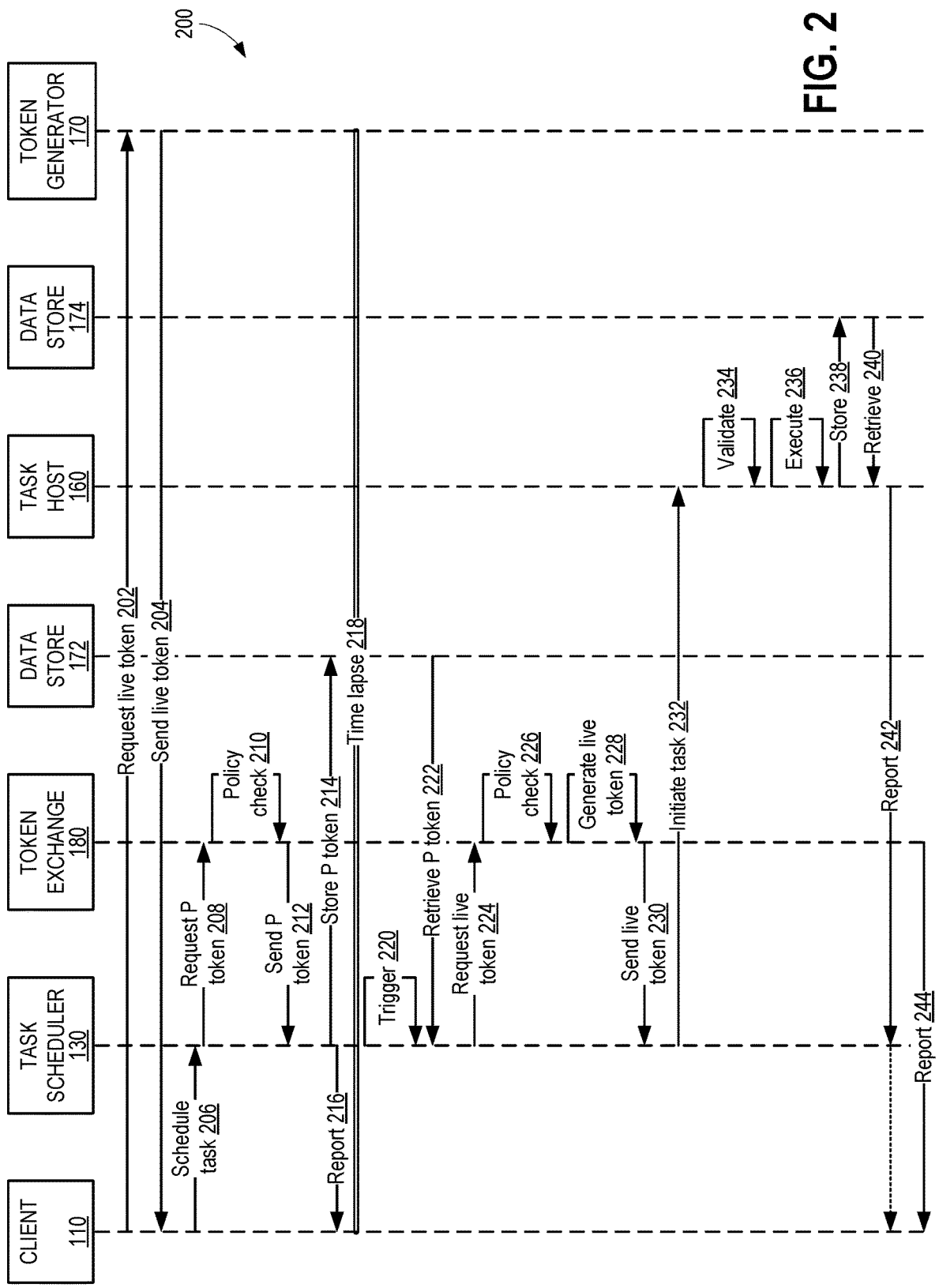
FIG. 2 illustrates a message flow diagram of exemplary messages associated with the architecture of FIG. 1.

Exemplary messaging among the nodes of architecture 100 is shown in FIG. 2, which illustrates a message flow diagram 200. Client 110 requests live token 118 from token generator 170, in message 202. Token generator 170 sends live token 118 to client 110, in message 204. Client 110 schedules a task with task scheduler 130, in message 206. Client 110 also sends task data 120 and a copy of live token 118 in message 206, which task scheduler 130 stores as live token 138. Task scheduler 130 requests that token exchange 180 exchange live token 138 for persistable token 140, in message 208. Task scheduler 130 also sends live token 138 and actor token 136 in message 208.

Token exchange 180 determines whether the request for persistable token 140 complies with first set of policies 190, in operation 210. Based at least on the request for persistable token 140 complying with first set of policies 190, token exchange 180 sends persistable token 140 to task scheduler 130, in message 212. Task scheduler 130 thus receives persistable token 140. Task scheduler 130 stores persistable token 140 in data store 172, in message 214. Task scheduler 130 reports to client 110 that the task is scheduled and ready to be executed upon a trigger event (specified by trigger 144), in message 216. A time lapse 218 exists until trigger 144 is detected.

Task scheduler 130 detects the trigger event in operation 220, and retrieves persistable token 140, via message 222. Task scheduler 130 requests that token exchange 180 exchange persistable token 140 for a replacement (second version) live token 138, in message 224. Task scheduler 130 also sends persistable token 140 and actor token 136 in message 224. Token exchange 180 determines whether the request for live token 138 complies with second set of policies 192, in operation 226. Based at least on the request for live token 138 complying with second set of policies 192, token exchange 180 generates live token 138b, in operation 228. In some examples, token exchange 180 generates live token 138b using an internal token generation capability. In some examples, token generation logic is implemented as a separate component or service with token exchange 180. Token exchange 180 sends live token 138a to task scheduler 130, in message 230. Task scheduler 130 thus receives live token 138a, which it stores as live token 138.

Based at least on receiving live token 138, task scheduler 130 initiates execution of the task with message 232 to task host 160. Message 232 includes live token 138 for authentication and/or authorization, because execution of the task is contingent upon proper authentication or authorization. Task host 160 validates the authorization of live token 138 in operation 234. If the validation is successful, task host 160 executes the task in operation 236, and stores results 176 in data store 174, with message 238. Task host 160 retrieves results 176 from data store 174, with message 240. In some examples, results are stored in data store for an extended period of time, until they are requested by client 110 or task scheduler 130. For example, retrieval of results 176 that were generated during a first task may be the subject of a subsequent task. In some examples, task host 160 does not use data store 174. Task host 160 sends results 176 to task scheduler 130 in a report message 242. Task scheduler 130 forwards results 176 to client 110 in a report message 244. In some examples, task host 160 sends results 176 directly to client 110 in report message 242, or another message.

Obtaining persistable token 140 requires a valid live token of the principal (e.g., client 110), a live actor token of the service requesting the exchange (e.g., task scheduler 130), and compliance with relevant policies set in token exchange 180 (e.g., first set of policies 190). Examples of policy compliance checks include the principal has the required privileges, and the requestor has the required privileges. Exchanging persistable token 140 for live token 138 requires a valid persistable token (e.g., persistable token 140), a live actor token of the service requesting the exchange, and compliance with relevant policies set in token exchange 180 (e.g., second set of policies 192). Examples of policy compliance checks include the actor is the currently-delegated holder of the persistable token, the principal has the required privileges, and the requestor has the required privileges.

Exemplary use cases of the disclosure include scheduling long-duration tasks that outlast the lifetime of live tokens, such as journaling, disaster recovery, and specifically recovery without network access, when data is stored locally. For example, a user may create a persistable token, and after a resource crash, the user may leverage the persistable token for recovery when network access, which would be needed for the user to receive a new live token directly, is unavailable. Journaling keeps track of changes that are not yet committed to main file storage, such as in a circular log, and a journaling session may outlast the lifetime of a live token.

Figure 3:
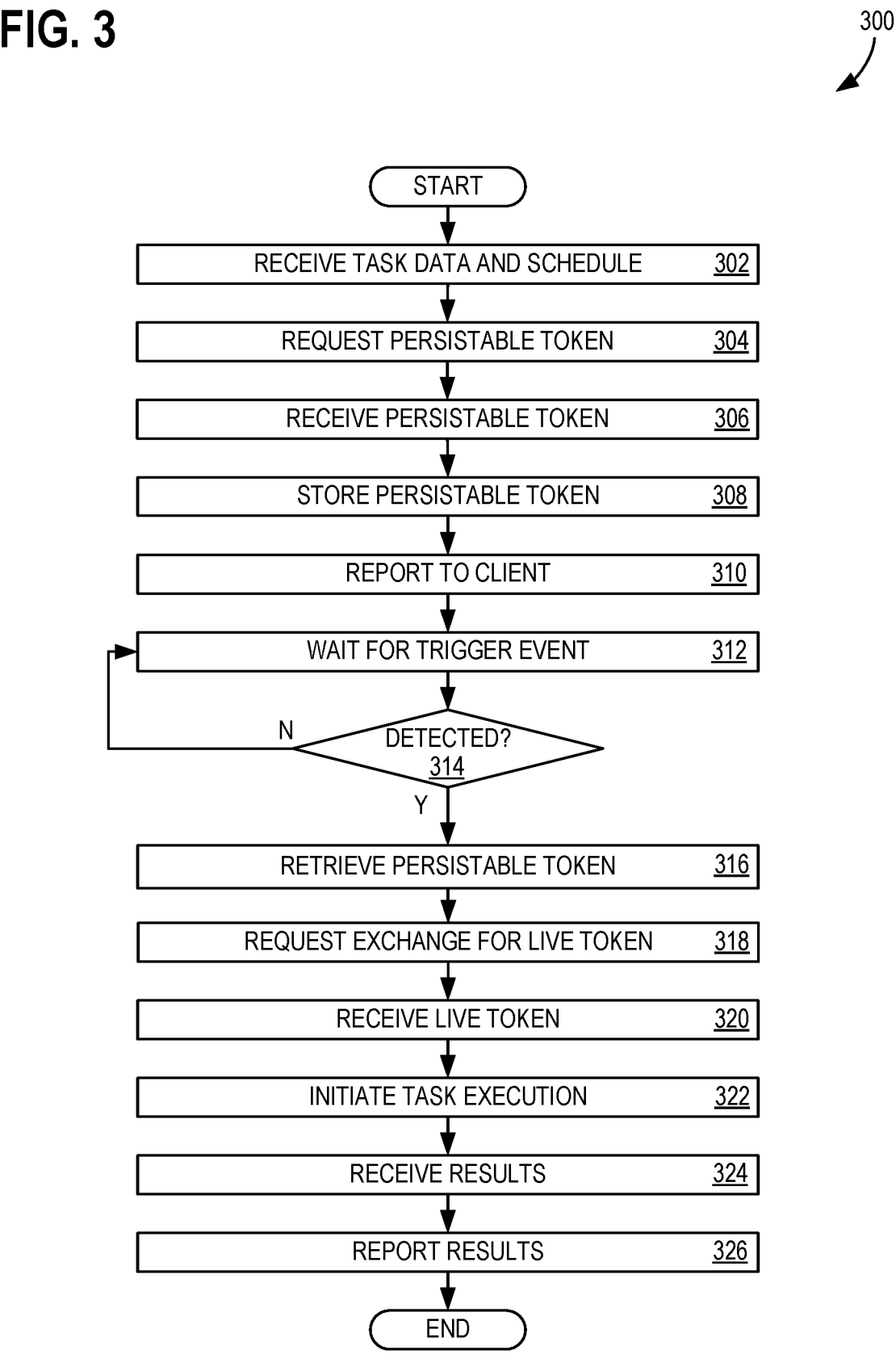
FIG. 3 illustrates a flow chart of exemplary operations associated with the architecture of FIG. 1 in which detection of a trigger event is performed.

FIG. 3 illustrates a flow chart 300 of exemplary operations performed by a task scheduler (e.g., task scheduler 130 of FIG. 1). In some examples, the operations of flow chart 300 are performed by one or more computing devices 700 of FIG. 7. A task is received in operation 302, including task data (e.g., task definition) and a schedule. The schedule includes a trigger, which may be a timer event, a condition, or another event. Operation 304 includes requesting, by a task scheduler, a persistable token in exchange for a first live token. In some examples, operation 304 also includes, in conjunction with requesting the persistable token in exchange for the first live token, identifying the task scheduler using an actor token. Operation 306 includes, based at least on the request for the persistable token complying with a first set of policies, receiving, by the task scheduler, the persistable token.

The persistable token is stored in operation 308, and a report is sent to the client in operation 310. The task scheduler waits for the trigger event at 312. Upon decision operation 314 detecting the trigger event, flow chart 300 moves to operation 316. The persistable token is retrieved from storage to be exchanged for a live token. Operation 318 includes, based at least on a trigger event, requesting, by the task scheduler, a second live token in exchange for the persistable token. In some examples, operation 318 also includes, in conjunction with requesting the second live token in exchange for the persistable token, identifying the task scheduler using an actor token. Operation 320 includes, based at least on the request for the persistable token complying with a second set of policies, receiving, by the task scheduler, the second live token. In some examples, at least one of the first set of policies and the second set of policies includes at least one restriction selected from the list consisting of: an exchange requestor identity, a live token subject, and token content.

Operation 322 includes, based at least on receiving the second live token, initiating execution of a task using the second live token for authentication or authorization, wherein the execution of the task is contingent upon the authentication or authorization. In some examples, initiating execution of a task using the second live token for authentication or authorization comprises resuming execution of a task in which the first live token had been used earlier for authentication. In some examples, initiating execution of a task using the second live token for authentication or authorization comprises executing the task using a resource that had been updated after the request for the persistable token. For example, with reference to FIG. 1, execution engine 166 may have been updated after persistable token 140 was received by task scheduler 130. Task results are received at 324 and reported to the client at 326.

Figure 4:
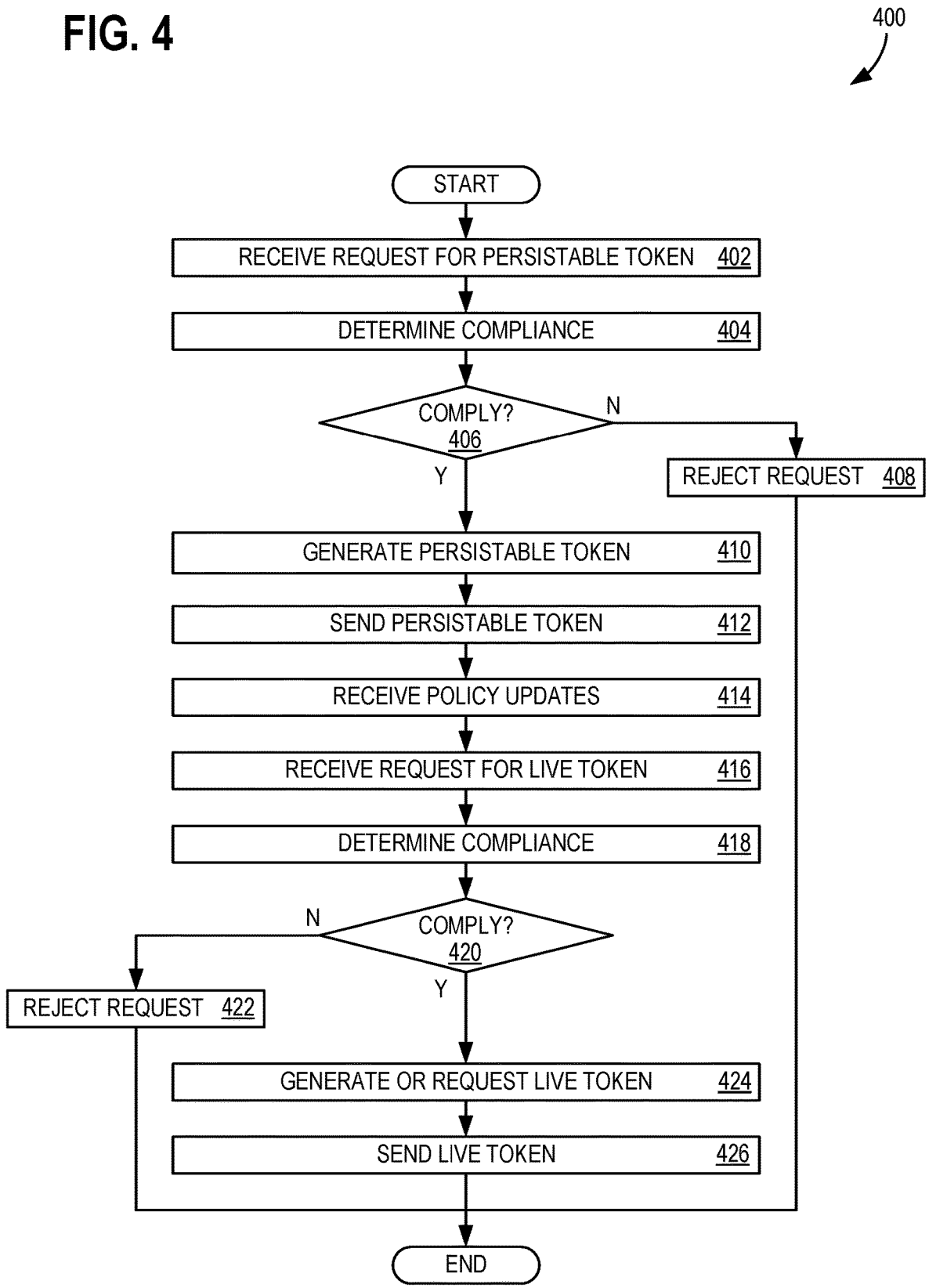
FIG. 4 illustrates another flow chart of exemplary operations associated with the architecture of FIG. 1 in which compliance is checked.

FIG. 4 illustrates a flow chart 400 of exemplary operations performed by a token exchange (e.g., token exchange 180 of FIG. 1). In some examples, the operations of flow chart 400 are performed by one or more computing devices 700 of FIG. 7. Operation 402 includes receiving a request for a persistable token from a task scheduler. Operation 404 includes, determining, by a token exchange, whether the request for the persistable token complies with a first set of policies. If the request does not comply, as determined in decision operation 406, the request is rejected at 408. Otherwise the persistable token is generated in operation 410. Operation 412 includes, based at least on the request for the persistable token complying with the first set of policies, sending the persistable token from the token exchange to the task scheduler.

Policy updates are received at 414. In some examples policy updates are received from an ML component. Operation 414 thus includes, after receiving the persistable token and prior to requesting a second live token, altering a second set of policies. In some examples, the alteration is selected from the list consisting of: extending a live token lifetime, extending a persistable token lifetime, adding privileges available with a live token, and curtailing privileges available with a live token. Operation 416 includes receiving a request for the second live token. Operation 418 includes, determining, by the token exchange, whether the request for the second live token has valid authorization and complies with the second set of policies. If the request does not comply, as determined in decision operation 420, the request is rejected at 422. Otherwise the second live token is generated in operation 424. In some examples, the live token is generated locally, within the token exchange. In some examples, the token exchange sends a request to a token generator and receives the second live token. Operation 426 includes, based at least on the request for the second live token complying with the second set of policies, sending the second live token from the token exchange to the task scheduler.

Figure 5:
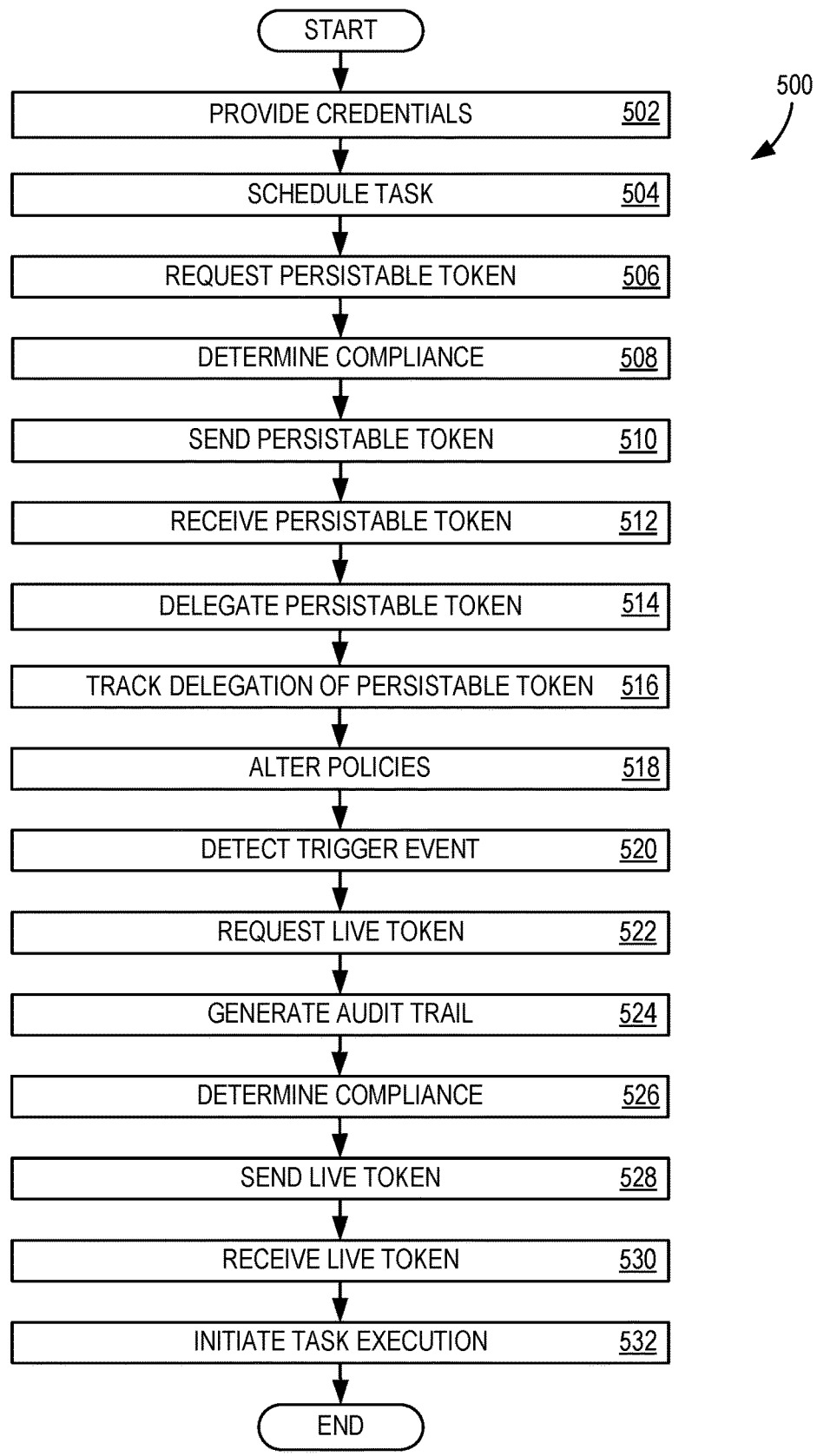
FIG. 5 illustrates another flow chart of exemplary operations associated with the architecture of FIG. 1 in which delegation occurs.

FIG. 5 illustrates a flow chart 500 showing a method of authentication or authorization via persistable identity tokens. In some examples, the operations of flow chart 500 are performed by one or more computing devices 700 of FIG. 7. It should be understood that the embodiment represented by flow chart 500 is simplified relative to FIGS. 3 and 4. A client provides credentials in operation 502, and schedules a task in operation 504. Operation 506 includes requesting, by a task scheduler, a persistable token in exchange for a first live token. In some examples, operation 506 includes, in conjunction with requesting the persistable token in exchange for the first live token, identifying the task scheduler using an actor token. Operation 508 includes determining, by a token exchange, whether the request for the persistable token complies with a first set of policies. Operation 510 includes, based at least on the request for the persistable token complying with the first set of policies, sending the persistable token from the token exchange to the task scheduler. Operation 512 includes, based at least on the request for the persistable token complying with a first set of policies, receiving, by the task scheduler, the persistable token.

In some examples, the task scheduler is able to delegate the persistable token to another task scheduler. Operation 514 includes delegating the persistable token to a second task scheduler, and operation 516 includes tracking the delegated holder of the persistable token. In some examples, the delegated holder of the persistable token is tracked to ensure that only the delegated holder is permitted to request an exchange for a live token.

Operation 518 includes, after receiving the persistable token and prior to requesting a second live token, altering a second set of policies. In some examples, the alteration is selected from the list consisting of: extending a live token lifetime, extending a persistable token lifetime, adding privileges available with a live token, and curtailing privileges available with a live token. In some examples, altering the second set of policies comprises curtailing privileges available with a live token based at least on actual token usage. In some examples, ML and/or AI functionality determines and performs the alteration.

A trigger event is detected at 520, and operation 522 includes, based at least on a trigger event, requesting, by the task scheduler, the second live token in exchange for the persistable token. In some examples, operation 522 also includes, in conjunction with requesting the second live token in exchange for the persistable token, identifying the task scheduler using an actor token. Because the persistable token has been exchanged, the task will be executed and this activity can be logged for auditing purposes. Operation 524 thus includes generating an audit trail based at least on the persistable token.

Operation 526 includes determining, by the token exchange, whether the request for the second live token complies with the second set of policies. In some examples, at least one of the first set of policies and the second set of policies includes at least one restriction selected from the list consisting of: an exchange requestor identity, a live token subject, and token content. Operation 528 includes, based at least on the request for the second live token complying with the second set of policies, sending the second live token from the token exchange to the task scheduler. Operation 530 includes, based at least on the request for the persistable token complying with a second set of policies, receiving, by the task scheduler, the second live token. Operation 532 includes, based at least on receiving the second live token, initiating execution of the task using the second live token for authentication, wherein the execution of the task is contingent upon the authentication or authorization. In some examples, initiating execution of a task using the second live token for authentication or authorization comprises resuming execution of a task in which the first live token had been used earlier for authentication or authorization. In some examples, initiating execution of a task using the second live token for authentication or authorization comprises executing the task using a resource that had been updated after the request for the persistable token.

Figure 6:
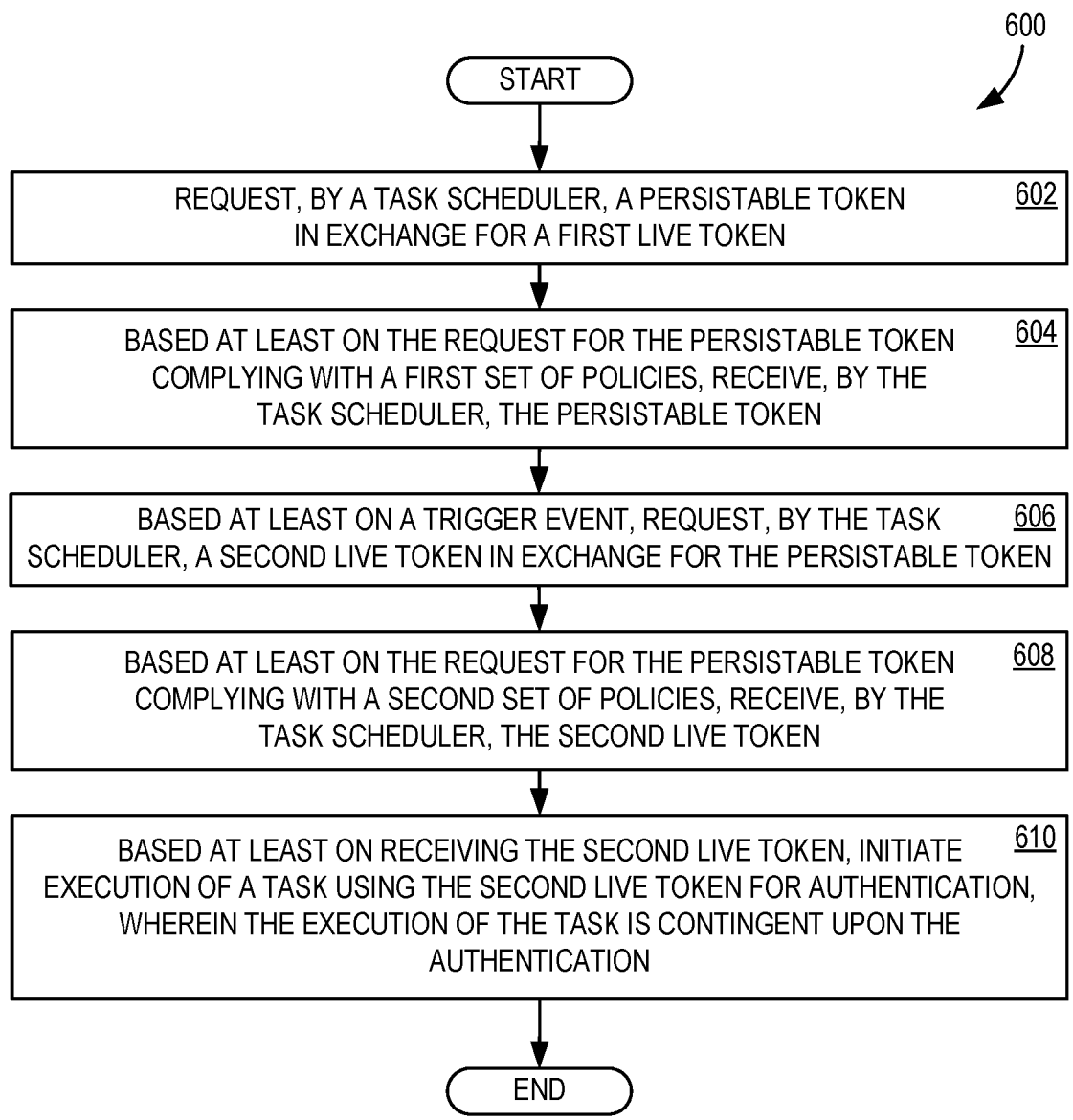
FIG. 6 illustrates another flow chart of exemplary operations associated with the architecture of FIG. 1.

FIG. 6 illustrates a flow chart 600 showing a method of authentication and/or authorization via persistable identity tokens. In some examples, the operations of flow chart 600 are performed by one or more computing devices 700 of FIG. 7. Operation 602 includes requesting, by a task scheduler, a persistable token in exchange for a first live token. Operation 604 includes, based at least on the request for the persistable token complying with a first set of policies, receiving, by the task scheduler, the persistable token. Operation 606 includes, based at least on a trigger event, requesting, by the task scheduler, a second live token in exchange for the persistable token. Operation 608 includes, based at least on the request for the persistable token complying with a second set of policies, receiving, by the task scheduler, the second live token. Operation 610 includes, based at least on receiving the second live token, initiating execution of a task using the second live token for authentication or authorization, wherein the execution of the task is contingent upon the authentication or authorization.

Figure 7:
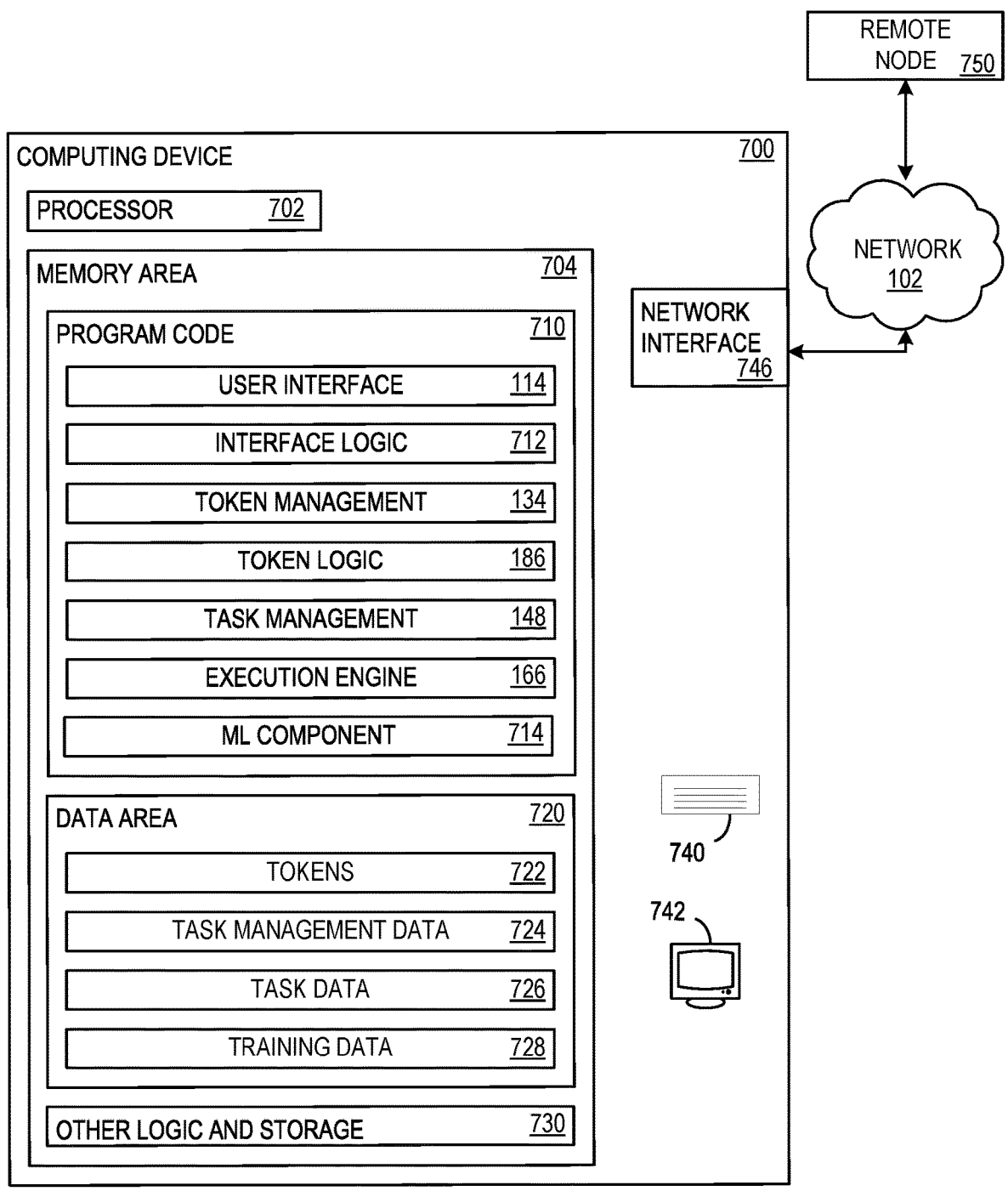
FIG. 7 illustrates a block diagram of a computing device that may be used with the architecture of FIG. 1, according to an example embodiment.

FIG. 7 illustrates a block diagram of computing device 700 that may be used with architecture 100 of FIG. 1. With reference to FIG. 1, computing device 700 may be used for any of client 110, task scheduler 130, second task scheduler 130a, task host 160, token exchange 180, token generator 170, and data stores 172 and 174. Computing device 700 has at least a processor 702 and a memory area 704 (or memory 704) that holds program code 710, a data area 720, and other logic and storage 730. Memory area 704 is any device allowing information, such as computer executable instructions and/or other data, to be stored and retrieved. For example, memory area 704 may include one or more random access memory (RAM) modules, flash memory modules, hard disks, solid-state disks, and/or optical disks. Program code 710 comprises computer executable instructions, and computer executable components including UI 114, interface logic 712, token management component 134, token logic component 186, task management component 148, execution engine 166, and ML component 714. Interface logic 712 includes and of interfaces 128, 132, 146, 162, and 182. ML component includes any of ML components 152 and 198.

Data area 720 holds tokens 722, task management data 724, task data 726, and training data 728. Tokens 722 includes any of tokens 136, 138, 138a, 138b, and 140. Task management data 724 holds any of trigger 144, historical data 188, first set of policies 190, and second set of policies 192. Task data 726 includes any of task data 120 and 150, and results 176. Training data holds any of feedback 154 and 196. Memory area 704 also includes other logic and storage 730 that performs or facilitates other functions disclosed herein or otherwise required of computing device 700. A keyboard 740 and a computer monitor 742 are illustrated as an exemplary portion of I/O 116. A network interface 746 permits communication over network 102 with remote node 750, which may represents any of the nodes identified in FIG. 1.

Computing device 700 represents any device executing instructions (e.g., as application programs, operating system functionality, or both) to implement the operations and functionality described herein. Computing device 700 may include any portable or non-portable device including a mobile telephone, laptop, tablet, computing pad, netbook, gaming device, portable media player, desktop personal computer, kiosk, embedded device, and/or tabletop device. Additionally, computing device 700 may represent a group of processing units or other computing devices, such as in a cloud computing system or service. Processor 702 may include any quantity of processing units and may be programmed to execute any components of program code 710 comprising computer executable instructions for implementing aspects of the disclosure. In some embodiments, processor 702 is programmed to execute instructions such as those illustrated in the figures.

Additional Examples

An example system for authentication or authorization via persistable identity tokens comprises: a processor; and a computer-readable medium storing instructions that are operative upon execution by the processor to: request, by a task scheduler, a persistable token in exchange for a first live token; based at least on the request for the persistable token complying with a first set of policies, receive, by the task scheduler, the persistable token; based at least on a trigger event, request, by the task scheduler, a second live token in exchange for the persistable token; based at least on the request for the persistable token complying with a second set of policies, receive, by the task scheduler, the second live token; and based at least on receiving the second live token, initiate execution of a task using the second live token for authentication or authorization, wherein the execution of the task is contingent upon the authentication or authorization.

An exemplary method of authentication or authorization via persistable identity tokens comprises: requesting, by a task scheduler, a persistable token in exchange for a first live token; based at least on the request for the persistable token complying with a first set of policies, receiving, by the task scheduler, the persistable token; based at least on a trigger event, requesting, by the task scheduler, a second live token in exchange for the persistable token; based at least on the request for the persistable token complying with a second set of policies, receiving, by the task scheduler, the second live token; and based at least on receiving the second live token, initiating execution of a task using the second live token for authentication or authorization, wherein the execution of the task is contingent upon the authentication or authorization.

One or more exemplary non-transitory computer storage medium having computer-executable instructions that, upon execution by a processor, cause the processor to at least perform operations that comprise: requesting, by a task scheduler, a persistable token in exchange for a first live token, wherein requesting the persistable token in exchange for the first live token comprises identifying the task scheduler using an actor token; based at least on the request for the persistable token complying with a first set of policies, receiving, by the task scheduler, the persistable token; based at least on a trigger event, requesting, by the task scheduler, a second live token in exchange for the persistable token, wherein requesting the second live token in exchange for the persistable token comprises identifying the task scheduler using an actor token; based at least on the request for the persistable token complying with a second set of policies, receiving, by the task scheduler, the second live token; and based at least on receiving the second live token, initiating execution of a task using the second live token for authentication or authorization, wherein the execution of the task is contingent upon the authentication or authorization.

Alternatively, or in addition to the other examples described herein, examples include any combination of the following:
  in conjunction with requesting the persistable token in exchange for the first live token, identifying the task scheduler using an actor token;
  in conjunction with requesting the second live token in exchange for the persistable token, identifying the task scheduler using an actor token;
  after receiving the persistable token and prior to requesting the second live token, altering the second set of policies;
  the alteration is selected from the list consisting of: extending a live token lifetime, extending a persistable token lifetime;
  adding privileges available with a live token, and curtailing privileges available with a live token;
  determining, by a token exchange, whether the request for the persistable token complies with the first set of policies;
  based at least on the request for the persistable token complying with the first set of policies, sending the persistable token from the token exchange to the task scheduler;
  determining, by the token exchange, whether the request for the second live token complies with the second set of policies;
  based at least on the request for the second live token complying with the second set of policies, sending the second live token from the token exchange to the task scheduler;
  at least one of the first set of policies and the second set of policies includes at least one restriction selected from the list consisting of: an exchange requestor identity, a live token subject, and token content;
  initiating execution of a task using the second live token for authentication or authorization comprises resuming execution of a task in which the first live token had been used earlier for authentication or authorization;
  initiating execution of a task using the second live token for authentication or authorization comprises executing the task using a resource that had been updated after the request for the persistable token;
  generating an audit trail based at least on the persistable token;
  delegating the persistable token to a second task scheduler;
  altering, with an ML or AI component, the second set of policies; and
  altering the second set of policies comprises curtailing privileges available with a live token based at least on actual token usage.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of authentication via persistable identity tokens, the method comprising:
   requesting, by a task scheduler, a persistable token in exchange for a first live token;
   based at least on the request for the persistable token complying with a first set of policies, receiving, by the task scheduler, the persistable token;
   based at least on a trigger event, requesting a second live token in exchange for the persistable token;
   based at least on the request for the persistable token complying with a second set of policies, receiving the second live token; and
   based at least on receiving the second live token, initiating execution of a task using the second live token for authentication, wherein the execution of the task is contingent upon the authentication.

2. The method of claim 1, wherein initiating execution of a task using the second live token for authentication comprises:
   resuming execution of a task in which the first live token had been used earlier for authentication; or
   executing the task using a resource that had been updated after the request for the persistable token.

3. The method of claim 1, further comprising:
   in conjunction with requesting the persistable token in exchange for the first live token or requesting the second live token in exchange for the persistable token, identifying the task scheduler using an actor token.

4. The method of claim 1, further comprising:
   after receiving the persistable token and prior to requesting the second live token, altering the second set of policies, wherein the alteration is selected from the list consisting of: extending a live token lifetime, extending a persistable token lifetime; adding privileges available with a live token, and curtailing privileges available with a live token.

5. The method of claim 1, further comprising:
   determining, by a token exchange, whether the request for the persistable token complies with the first set of policies;
   based at least on the request for the persistable token complying with the first set of policies, sending the persistable token from the token exchange to the task scheduler;
   determining, by the token exchange, whether the request for the second live token complies with the second set of policies; and
   based at least on the request for the second live token complying with the second set of policies, sending the second live token from the token exchange to the task scheduler; and
   wherein at least one of the first set of policies and the second set of policies includes at least one restriction selected from the list consisting of: an exchange requestor identity, a live token subject, and token content.

6. The method of claim 1, further comprising:
   delegating the persistable token to a second task scheduler.

7. The method of claim 1, further comprising:
   altering, with a machine learning (ML) or artificial intelligence (AI) component, the second set of policies, wherein altering the second set of policies comprises curtailing privileges available with a live token based at least on actual token usage.

8. A computer system for authentication via persistable identity tokens, the computer system comprising:
   a processor; and
   a non-transitory computer readable medium having stored thereon program code for transferring data to another computer system, the program code causing the processor to:
   request, by a task scheduler, a persistable token in exchange for a first live token;
   based at least on the request for the persistable token complying with a first set of policies, receive, by the task scheduler, the persistable token;
   based at least on a trigger event, request, by the task scheduler, a second live token in exchange for the persistable token;

based at least on the request for the persistable token
complying with a second set of policies, receive, by
the task scheduler, the second live token; and
based at least on receiving the second live token,
initiate execution of a task using the second live
token for authentication, wherein the execution of
the task is contingent upon the authentication.

9. The computer system of claim 8, wherein initiating execution of a task using the second live token for authentication comprises:
resuming execution of a task in which the first live token had been used earlier for authentication.

10. The computer system of claim 8, wherein initiating execution of a task using the second live token for authentication comprises:
executing the task using a resource that had been updated after the request for the persistable token.

11. The computer system of claim 8, wherein the program code is further operative to:
in conjunction with requesting the persistable token in exchange for the first live token or requesting the second live token in exchange for the persistable token, identify the task scheduler using an actor token.

12. The computer system of claim 8, wherein the program code is further operative to:
after receiving the persistable token and prior to requesting the second live token, alter the second set of policies, wherein the alteration is selected from the list consisting of: extending a live token lifetime, extending a persistable token lifetime; adding privileges available with a live token, and curtailing privileges available with a live token.

13. The computer system of claim 8, wherein the program code is further operative to:
determine, by a token exchange, whether the request for the persistable token complies with the first set of policies;
based at least on the request for the persistable token complying with the first set of policies, send the persistable token from the token exchange to the task scheduler;
determine, by the token exchange, whether the request for the second live token complies with the second set of policies; and
based at least on the request for the second live token complying with the second set of policies, send the second live token from the token exchange to the task scheduler; and
wherein at least one of the first set of policies and the second set of policies includes at least one restriction selected from the list consisting of: an exchange requestor identity, a live token subject, and token content.

14. The computer system of claim 8, wherein the program code is further operative to:
alter, with a machine learning (ML) or artificial intelligence (AI) component, the second set of policies, wherein altering the second set of policies comprises curtailing privileges available with a live token based at least on actual token usage.

15. A non-transitory computer readable storage medium having stored thereon program code executable by a first computer system at a first site, the program code embodying a method comprising:
requesting, by a task scheduler, a persistable token in exchange for a first live token, wherein requesting the persistable token in exchange for the first live token comprises identifying the task scheduler using an actor token;
based at least on the request for the persistable token complying with a first set of policies, receiving, by the task scheduler, the persistable token;
based at least on a trigger event, requesting, by the task scheduler, a second live token in exchange for the persistable token, wherein requesting the second live token in exchange for the persistable token comprises identifying the task scheduler using an actor token;
based at least on the request for the persistable token complying with a second set of policies, receiving, by the task scheduler, the second live token; and
based at least on receiving the second live token, initiating execution of a task using the second live token for authentication or authorization, wherein the execution of the task is contingent upon the authentication or authorization.

16. The non-transitory computer storage medium of claim 15, wherein initiating execution of a task using the second live token for authentication or authorization comprises:
resuming execution of a task in which the first live token had been used earlier for authentication or authorization; or
executing the task using a resource that had been updated after the request for the persistable token.

17. The non-transitory computer storage medium of claim 15, wherein the program code further comprises:
after receiving the persistable token and prior to requesting the second live token, altering the second set of policies, wherein the alteration is selected from the list consisting of: extending a live token lifetime, extending a persistable token lifetime; adding privileges available with a live token, and curtailing privileges available with a live token.

18. The non-transitory computer storage medium of claim 15, wherein the program code further comprises:
determining, by a token exchange, whether the request for the persistable token complies with the first set of policies;
based at least on the request for the persistable token complying with the first set of policies, sending the persistable token from the token exchange to the task scheduler;
determining, by the token exchange, whether the request for the second live token complies with the second set of policies; and
based at least on the request for the second live token complying with the second set of policies, sending the second live token from the token exchange to the task scheduler; and
wherein at least one of the first set of policies and the second set of policies includes at least one restriction selected from the list consisting of: an exchange requestor identity, a live token subject, and token content.

19. The non-transitory computer storage medium of claim 15, wherein the program code further comprises:
generating an audit trail based at least on the persistable token.

20. The non-transitory computer storage medium of claim 15, wherein the program code further comprises:
altering, with a machine learning (ML) or artificial intelligence (AI) component, the second set of policies, wherein altering the second set of policies comprises curtailing privileges available with a live token based at least on actual token usage.

\* \* \* \* \*